United States Patent [19]

Stog

[11] 4,350,589
[45] Sep. 21, 1982

[54] FLOATING JET AERATOR

[75] Inventor: Wilhelm Stog, Waltrop, Fed. Rep. of Germany

[73] Assignee: WSW Stahl- und Wasserbau GmbH, Waltrop, Fed. Rep. of Germany

[21] Appl. No.: 281,644

[22] Filed: Jul. 9, 1981

[30] Foreign Application Priority Data

Jul. 12, 1980 [DE] Fed. Rep. of Germany ....... 3026519

[51] Int. Cl.³ .............................. B01F 3/04; C02F 7/00
[52] U.S. Cl. ................................ 210/220; 210/242.2; 261/120; 261/122; 261/DIG. 75
[58] Field of Search .................... 210/205, 220, 221.1, 210/242.2; 261/77, 120, 122, 123, DIG. 75

[56] References Cited

U.S. PATENT DOCUMENTS

| | | | |
|---|---|---|---|
| 3,490,752 | 1/1970 | Danjes et al. ........................ | 261/122 |
| 3,589,997 | 6/1971 | Grutsch et al. ............... | 210/242.2 X |
| 3,664,647 | 5/1972 | Snow et al. ..................... | 261/122 X |
| 3,984,323 | 10/1976 | Evens ................................. | 210/220 |
| 4,072,612 | 2/1978 | Daniel .......................... | 261/DIG. 75 |
| 4,086,306 | 4/1978 | Yoshinaga ...................... | 261/120 X |
| 4,191,479 | 3/1980 | Shuck et al. ..................... | 261/120 X |
| 4,215,082 | 7/1980 | Danel ............................. | 261/123 X |

FOREIGN PATENT DOCUMENTS 1377571 12/1964 France.
195735 4/1923 United Kingdom ................ 261/122

Primary Examiner—Robert H. Spitzer
Attorney, Agent, or Firm—Karl F. Ross

[57] ABSTRACT

A water-aeration apparatus has a tubular frame defining a substantially closed chamber and capable of floating and carrying a load when the chamber is filled with air. Flood and bleed valves are provided at respective underwater water intakes and above-water air exhausts for introducing water into the chamber and for withdrawing air therefrom. A double-walled conduit is supported on the frame and has an outer substantially gas-impervious wall and, spaced inwardly therefrom, an inner gas-pervious wall. The conduit is inclined to the horizontal when the frame is floating and has an upper conduit end and a lower conduit end. A pump carried on the frame has an air intake above the water when the frame is floating and an air output at the lower end and directed toward the upper end.

15 Claims, 7 Drawing Figures

FLOATING JET AERATOR

FIELD OF THE INVENTION

The present invention relates to a jet aerator used in the transfer of oxygen in the biological treatment of wastewater. More particularly this invention concerns such an aerator usable in a lagoon or open body of water.

BACKGROUND OF THE INVENTION

It is well known to aerate wastewater by injecting air under pressure into the water. The air is mixed with the wastewater and injected as a horizontal jet plume containing a multiplicity of bubbles for excellent water/air contact. This plume rises as a vertical jet flux that maximizes the contact and thereby overcomes as much as possible the low solubility of oxygen and consequent low rate of oxygen transfer between the air and the water. This is done to oxidize and kill many biologically active and potentially harmful bacteria. Such systems are described in French Pat. No. 1,377,571 filed Sept. 27, 1963 by Establissements Luchaire and in U.S. Pat. No. 3,984,323 of F. Evens as well as in Wastewater Engineering: Treatment, Disposal, Reuse by Metcalf and Eddy, Inc. (McGraw-Hill: 1979).

In order to maximize the contact time and thereby concomitantly increase the oxygen absorption it has been suggested to form the horizontal jet plume inside a horizontally elongated underwater tube. This tube is formed of a screen and is provided over at least its upper portion with a cap so that bubbles that pass upwardly through the screen are captured under the cap. Such an arrangement maintains the bubbles as small as possible so that the surface area exposed to the water is as large as possible.

Such devices frequently become clogged, as the water intake for the jet pump pulls in some particulate material that fouls the screen and makes it gas impervious. The entire device normally stands on the bottom of the body of water being treated and generates considerable turbulence, so that the water around the water intake is more laden with particles than the rest of the wastewater. Furthermore it is frequently necessary to protect the compressor needed for such a pump from changes in water level by providing it on land next to the body of wastewater being treated. This requires long hoses and leaves the compressor in a location where it could come to harm from human hands and where the considerable noise it generates can bother persons living or working nearby.

OBJECTS OF THE INVENTION

It is therefore an object of the present invention to provide an improved jet aerator.

Another object is the provision of such an aerator which overcomes the above-given disadvantages of the prior-art systems.

SUMMARY OF THE INVENTION

These objects are attained according to the instant invention in a water-aeration apparatus having a tubular frame defining a substantially closed chamber and capable of floating and carrying a load when the chamber is filled with air. Means is provided, in the form of appropriate flood and bleed valves at respective underwater water intakes and above-water air exhausts, for introducing water into the chamber and for withdrawing air therefrom. A double-walled conduit is supported on the frame and has an outer substantially gas-impervious wall and, spaced inwardly therefrom, an inner gas-pervious wall. The conduit is inclined to the horizontal when the frame is floating and has an upper conduit end and a lower conduit end. A pump carried on the frame has an air intake above the water when the frame is floating and an air output at the lower end and directed toward the upper end. The system according to the instant invention can therefore sit out on the body of wastewater. Even if the water level moves, the jet plume formed by it will always be at just the right depth. Furthermore the pump, which according to this invention comprises a compressor and a motor, is provided underwater where it is largely out of harm's way and where the noise it generates is effectively muffled. Only the air intake for the pump and the electric cable for its drive motor need extend above the water level. This air intake is itself provided with a sound muffler.

According to further features of this invention the frame is generally parallopipedal and includes upper and lower longitudinal tubes extending horizontally along and flanking the conduit, transverse tubes horizontally bridging the longitudinal tubes, and vertical tubes between the upper and lower tubes. The water intake for flooding the chamber of the hollow frame can be provided on one of the lower tubes and the bleed valve on one of the upper tubes. The flood valves can be provided with long vertically upwardly projecting handles to allow them to be operated from above the water level. Such provision of the flood valves and the respective water intakes allows the chamber to be filled rapidly.

According to this invention at least one partition or bulkhead subdivides the chamber into a pair of independent subchambers each provided with its own respective flood and bleed valves. This bulkhead normally is provided generally centrally of the horizontally elongated frame so that it is possible by flooding one of the subchambers more than the other to incline the frame in the water and thereby adjust the inclination of the double-walled conduit. As a result this conduit can be fixed on the frame, while still being adjustable as to inclination.

The frame, in order to compensate for the extra weight of the pump, has more of the transverse tubes adjacent the pump than remote therefrom. This increases the bouyancy of the frame at the heavy pump to allow the frame to be maintained level in the water.

According to another feature of this invention the upper tubes are provided generally centrally with supports and with a grid platform on the supports. This platform is provided generally at the bulkhead and the bleed and flood valves along with the air intake of the pump are also provided adjacent this platform, so all servicing of the apparatus according to this invention can be carried out from the dry platform. The supports for the platform can be vertically extensible to allow the platform to be above the water level even when the rest of the apparatus is completely below water, as is advantageous in extremely windy locations or when there is a chance of freezing.

In order for the pump to draw in the most oxygen-poor water, which normally is at the bottom, the pump has a water intake constituted as a hose extending from the pump and having an end provided with a water-intake device adapted to sit on the bottom at a distance from the frame. The intake device comprises an upwardly open intake fitting on the end of the hose, a box surrounding the intake fitting and having a closed top above the intake fitting and sides flanking the fitting, and particle filters in the sides of the box. Normally outer coarse filters of large mesh size are provided with inner filters of small mesh size. Provision of such an intake not only ensures that the most oxygen-poor water is pulled in and aerated, but it also allows the water intake to be spaced well away from the jet aerator and the turbulence it generates.

In order to maximize the air/water contact time, the inner wall has a vertically displaceable inner-wall end at the upper end of the conduit. This inner-wall end is normally directed downwardly. The outer wall is also vertically displaceable at the upper end. Thus the aerated water can be directed downwardly as it leaves the apparatus according to this invention.

In accordance with another feature of this invention a plurality of such floating jet aerators are provided in an annular array in a body of water so as to generate a circulation current in the body. Thus not only will oxygen-poor water be pulled in and aerated, but every portion of the body of wastewater will be swept by the circulation and will therefore be treated.

The system according to the instant invention can easily be left in place for long periods of time. It can be left moored on a body of water virtually without supervision and will create no nuisance while it does its work. Since it is provided out in a body of wastewater it will be relatively inaccessible and completely safe from most types of hazard.

DESCRIPTION OF THE DRAWING

The above and other objects, features, and advantages will become more readily apparent from the following, reference being made to the accompanying drawing in which.

SPECIFIC DESCRIPTION

Figure 1:
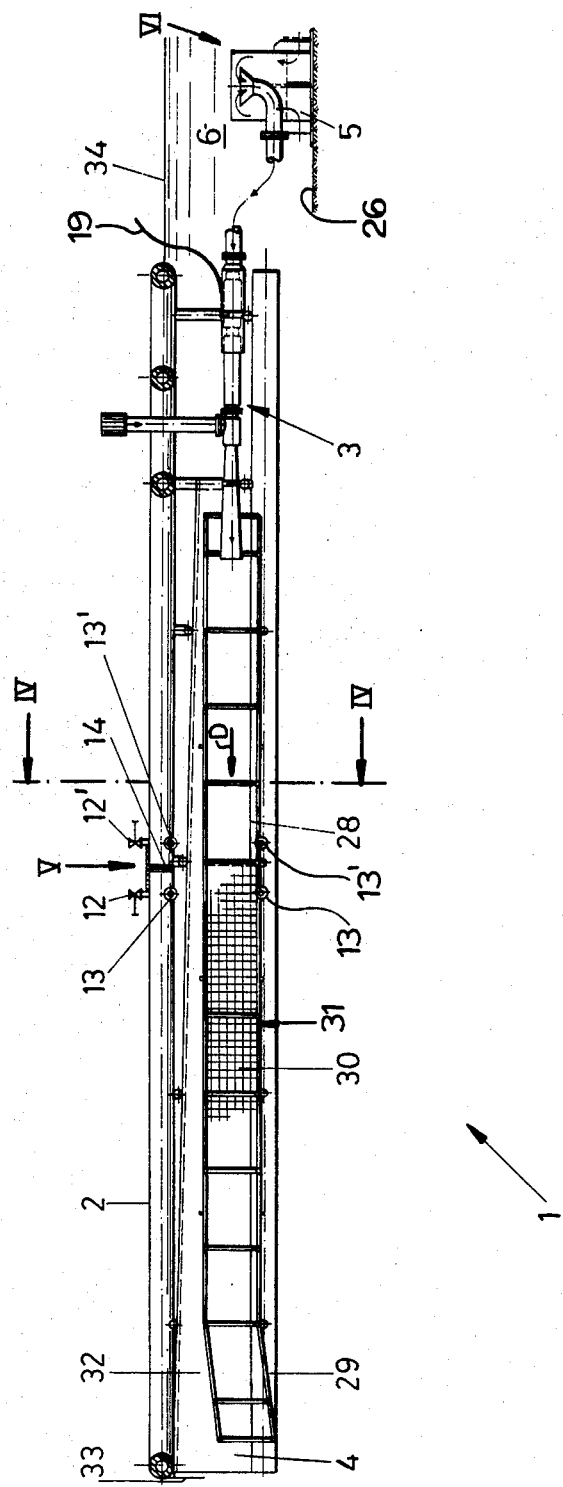
FIG. 1 is a vertical and longitudinal section through the apparatus according to this invention.

As seen in FIG. 1 a floating water aerator according to the instant invention basically comprises a parallelopipedal hollow frame generally indicated at 2, a jet pump 3, and a double-walled tube indicated generally at 4. The pump 3 has an intake 5 and the entire apparatus floats in a body 6 of wastewater to be treated having a bottom 26 and a top surface level 34.

FIGS. 2–5 show how the floating frame 2 is formed of longitudinally extending upper tubes 7 of relatively large diameter, longitudinally extending lower tubes 8 of relatively large diameter, transverse lower tubes 9 of relatively small diameter interconnecting the lower tubes 8, transverse upper tubes 9', 9'', 9''', and 11 of relatively large diameter interconnecting the upper tubes 7, and vertical tubes 10 of intermediate diameter connecting the upper tubes 7 to the respective lower tubes. Bulkheads 14 (FIGS. 1 and 5) subdivide the interiors of these tubes into independent downstream and upstream subcompartments 15 and 16 having respective bleed valves 12 and 12' and flood valves 13 and 13'. The frame 2 is provided at its center, over the bulkheads 14, with four vertically extensible supports 17 on which is mounted a grid platform 18 from which the valves 12–13' are all accessible.

Figure 2:
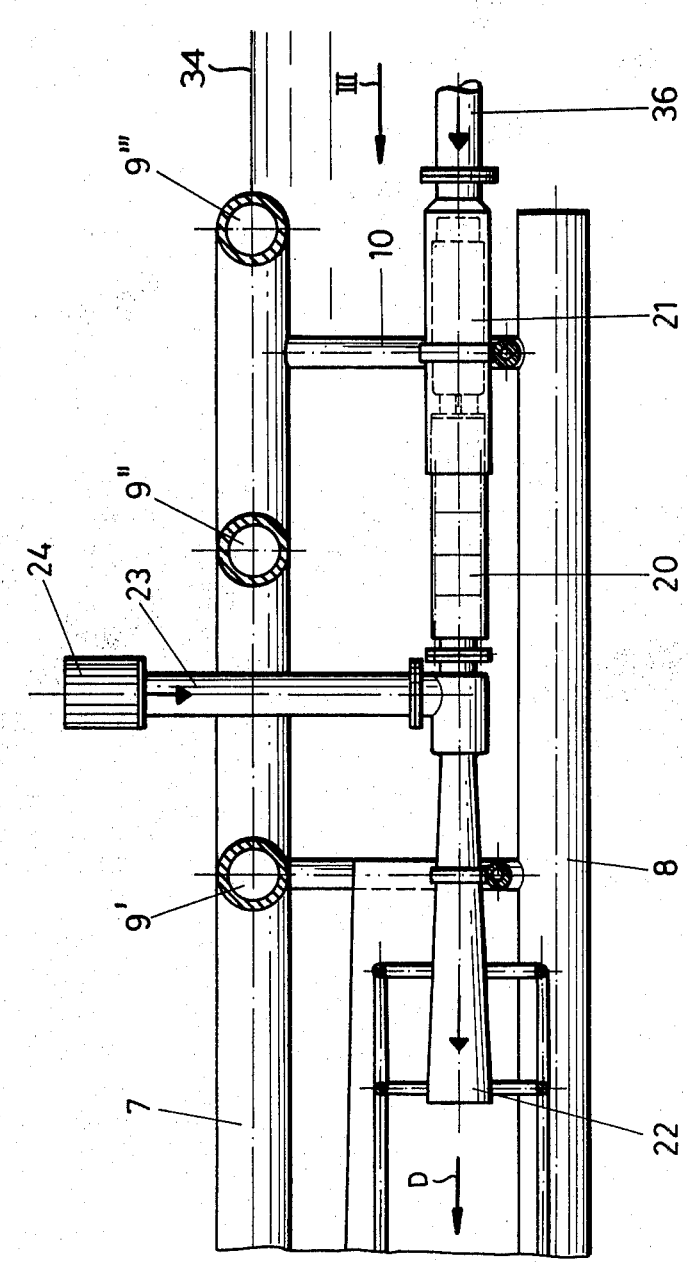
FIG. 2 is a large-scale view of a detail of FIG. 1.
Figure 3:
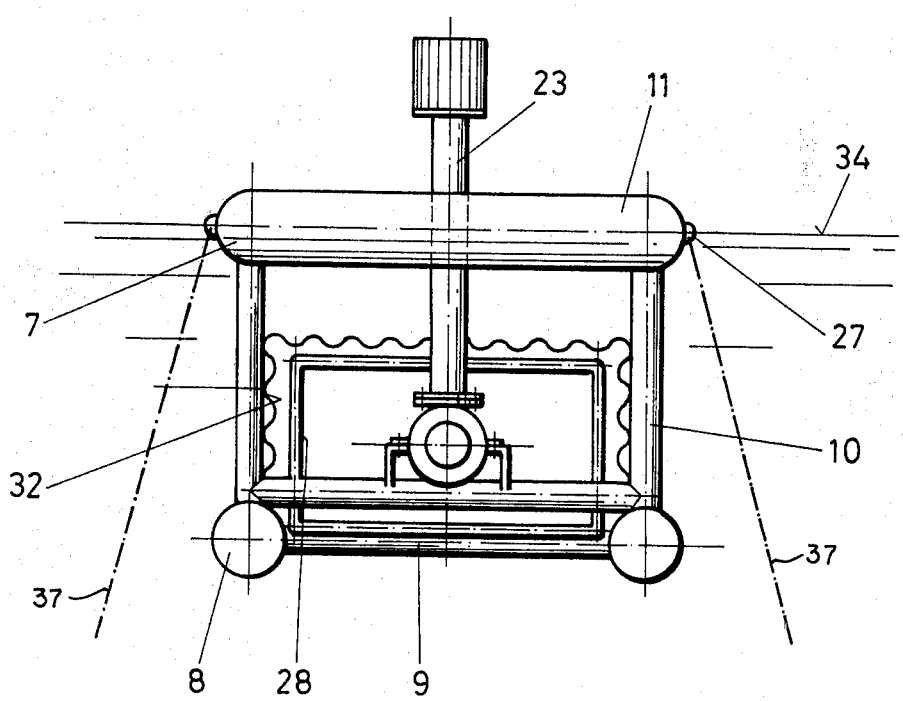
FIG. 3 is an end view taken in the direction of arrow III of FIG. 2.
Figure 4:
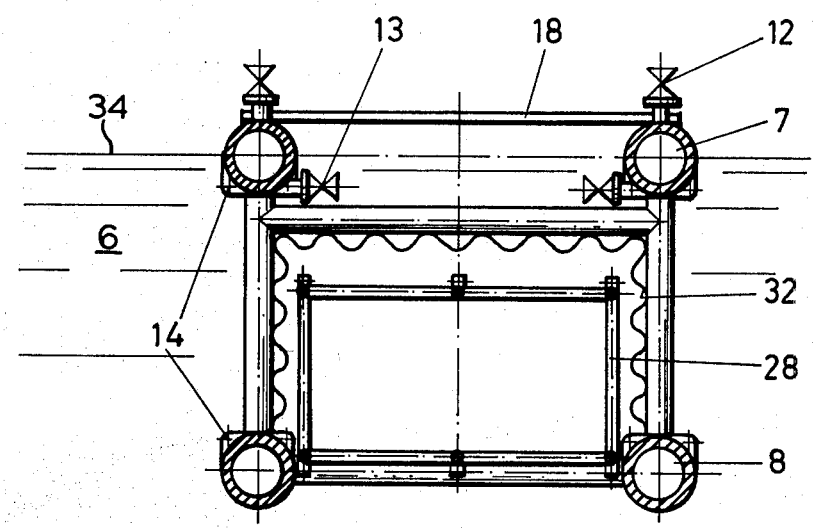
FIG. 4 is a large-scale section taken along line IV—IV of FIG. 1.
Figure 5:
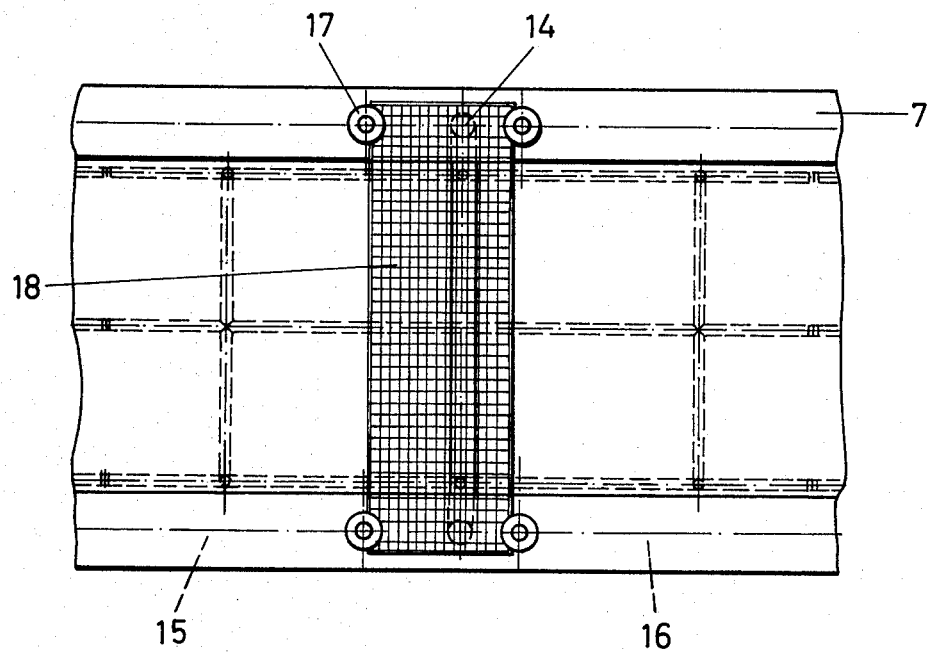
FIG. 5 is a large-scale top view taken in the direction of arrow V of FIG. 1.

The jet pump 3 comprises as best shown in FIG. 2 a pump 20 operated by a coaxial electric motor 21. The pump 20 itself has an air intake 23 extending vertically up above the water level 34 and provided at its upper end with a sound muffler 24, a longitudinally extending and flared output nozzle 22, and a water intake connection 36. The water drawn in through the intake 36 passes over the sealed motor 21 to cool it, then passes in direction D into the upstream end of the conduit 4.

The conduit 4 extends longitudinally along the frame 2 and is formed by an inner wall 31 constituted by a frame 28 over which is stretched a gas-pervious synthetic-resin mesh 30 and an outer wall 32 which is gas impervious and need only be downwardly U-shaped to cover the top and sides of the inner wall 31. This outer wall 32 has longitudinally extending corrugations and its upper side is inclined upwardly from an upstream end at the pump 3 to a downstream end provided with a vertically displaceable flap 33. The inner wall 31 is inclined downwardly and has a downstream end 29 which is vertically displaceable and which is normally pointed somewhat downwardly to deflect water flowing out of it down in the body 6.

Figure 6:
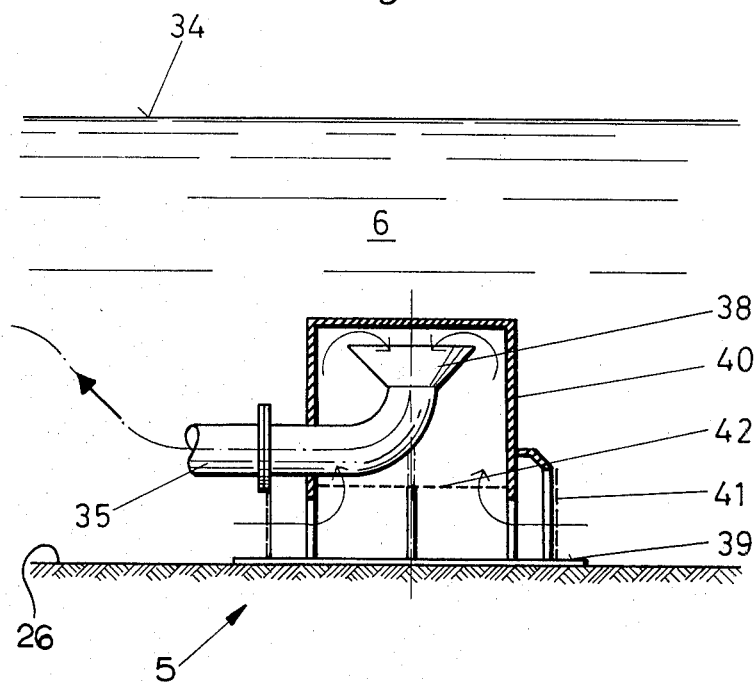
FIG. 6 is a large-scale view of the detail indicated at arrow VI in FIG. 1.
Figure 7:
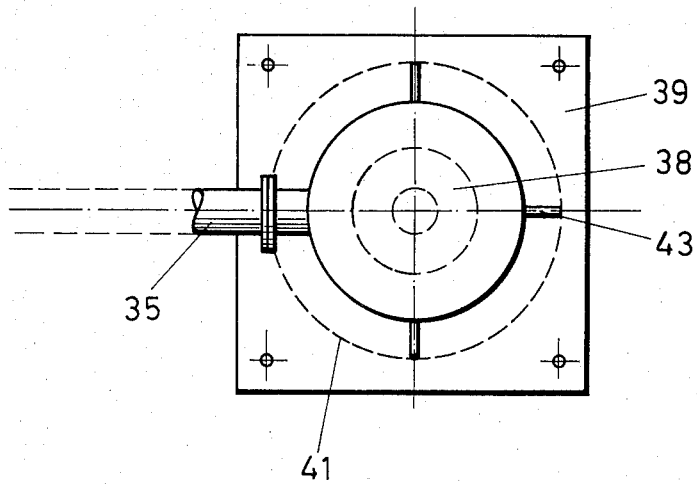
FIG. 7 is a top view of the detail of FIG. 6.

The pump intake connection 36 is connected to a flexible large-diameter hose 35 provides on its end with the water intake 5 that sits on the bottom 26. This intake 5 comprises as best shown in FIGS. 6 and 7 a box 40 having a closed top and having sides whose upper portions are closed. The hose 35 is provided with an upwardly open funnel-shaped inlet end 38 that opens in the box 40 immediately beneath the upper wall thereof. A pair of coarse-mesh filters 41 are held by support struts 43 outside the openings at the bottom of the sides of the box 40, and a fine-mesh filter extends horizontally across the box 40 underneath the inlet end 38. The box 40 has a weighted base 39 that makes it sit stably on the bottom 26.

The apparatus according to the instant invention is normally moored at some location distant from the shore of the body 6 of wastewater it is to aerate and secured in place by cables 37 attached to eyes 27 on the upper tubes 7. The vent or bleed valves 12 and 12' as well as the flood valves 13 and 13' are then opened to admit sufficient water to submerge the frame 2 to the desired extent. Normally the arrangement is only submerged to the extent shown, that is until the upper tubes 7 and 11 are half under the water, although it is possible to submerge it fully. If submerged well below the water level 34 the supports 17 are pulled up to hold the platform 18 above the water level 34. In addition, if the conduit 4 is to be inclined more or less to the horizontal, one of the chambers 15 or 16 is filled more or less than the other to appropriately tip the frame 2.

The intake 5 is then positioned at some distance from the frame 2, normally upstream therefrom relative to the direction D and at the deepest part of the body 6. Then the motor 21 of the pump 20 is energized through its cable 18. The pump 3 then draws in air through the intake 23 and water through the intake 5 and expels a jet or plume of finely mixed water and air bubbles into the upstream end of the conduit 4. The air rises naturally but is prevented from quickly leaving the conduit 4 by the wall mesh 30. Eventually the air passes through the inner wall 31 and then along the outer wall 32 and out of the downstream end, meanwhile spending quite some time in contact with the water and transferring considerable oxygen thereto. The water meanwhile is moved in the direction D, entraining water jet-fashion from around the upstream end of the conduit 4.

For a large body 6 it has been found extremely efficient to provide an annular array of the aerators 1 arranged head to tail so that water leaving the downstream end of one enters the upstream end of the succeeding one to move the water in the body in a rotating manner. If all of the intakes 5 of the aerators 1 are provided at the center of the body, an inwardly spiraling flow will be created that will insure that the entire body is efficiently aerated.

I claim:

1. A water-aeration apparatus comprising:
    a tubular form defining a substantially closed chamber, said frame being capable of floating and carrying a load when said chamber is filled with air;
    means for introducing water into said chamber and for withdrawing air therefrom;
    a double-walled conduit supported on said frame and having an outer substantially gas-impervious wall and spaced inwardly therefrom an inner gas-pervious wall, said conduit being inclined to the horizontal when said frame is floating and having an upper conduit end and a lower conduit end; and
    a pump carried on said frame and having an air intake above the water when said frame is floating and an air output at said lower end and directed toward said upper end.

2. The apparatus defined in claim 1 wherein said frame is elongated and generally parallopipedal and includes upper and lower longitudinal tubes extending horizontally along and flanking said conduit, transverse tubes horizontally bridging said longitudinally tubes, and vertical tubes between said upper and lower tubes, said conduit extending longitudinally in said frame.

3. The apparatus defined in claim 2, further comprising at least one bulkhead subdividing said chamber into a pair of independent subchambers each provided with its own respective such means.

4. The apparatus defined in claim 2 wherein said means includes a water intake opening below the water when said frame is floating and having a flood valve and an air exhaust opening above the water when said frame is floating and having a bleed valve.

5. The apparatus defined in claim 4 wherein said water intake is provided on one of said lower tubes.

6. The apparatus defined in claim 2 wherein said frame, in order to compensate for the extra weight of said pump, has more of said transverse tubes adjacent said pump than remote therefrom.

7. The apparatus defined in claim 6 wherein said pump includes a compressor having said intake and output and a motor coaxially with said compressor.

8. The apparatus defined in claim 6 wherein said intake is provided with a sound muffler.

9. The apparatus defined in claim 2 wherein said upper tubes are provided generally centrally with supports and with a grid platform on said supports.

10. The apparatus defined in claim 2 wherein said pump has a water intake below the surface when said frame is floating, said intake being a hose extending from said pump and having an end provided with a water-intake device adapted to sit on the bottom at a distance from said frame.

11. The apparatus defined in claim 10 wherein said intake device comprises:
    an upwardly open intake fitting on said end of said hose;
    a box surrounding said intake fitting and having a closed top above said intake fitting and sides flanking said fitting; and
    particle filters in said sides of said box.

12. The apparatus defined in claim 2 wherein said inner wall has an inner-wall end at said upper end of said conduit said inner-wall end being vertically displaceable relative to said frame.

13. The apparatus defined in claim 12 wherein said inner-wall end is directed downwardly.

14. The apparatus defined in claim 2 wherein said frame is provided with anchor eyes, whereby said frame can be moored by said eyes.

15. The apparatus defined in claim 2 wherein said outer wall is vertically displaceable at said upper end.

* * * * *